(12) United States Patent
Krauter et al.

(10) Patent No.: US 9,514,434 B2
(45) Date of Patent: Dec. 6, 2016

(54) APPARATUS AND METHOD FOR AUTOMATIC WORK INSTRUCTION GENERATION

(75) Inventors: Lance Gerard Krauter, Maple Valley, WA (US); Daniel Martin Eide, Renton, WA (US); Kerwin Karl Kersavage, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 2302 days.

(21) Appl. No.: 12/349,191

(22) Filed: Jan. 6, 2009

(65) Prior Publication Data

US 2010/0175013 A1 Jul. 8, 2010

(51) Int. Cl.
*G06F 19/00* (2011.01)
*G06Q 10/10* (2012.01)
*G06Q 50/04* (2012.01)

(52) U.S. Cl.
CPC .............. *G06Q 10/10* (2013.01); *G06Q 50/04* (2013.01); *Y02P 90/30* (2015.11)

(58) Field of Classification Search
USPC ........... 700/96–98, 188, 195; 705/7.11–7.13, 705/7.22, 7.37; 715/751; 382/152, 154, 190, 382/286
See application file for complete search history.

(56) References Cited

U.S. PATENT DOCUMENTS

| | | | | |
|---|---|---|---|---|
| 4,945,488 A * | 7/1990 | Carver et al. | | 700/182 |
| 5,644,493 A * | 7/1997 | Motai et al. | | 700/96 |
| 5,806,078 A * | 9/1998 | Hug | | G06F 17/2288 707/999.202 |
| 6,240,328 B1 * | 5/2001 | LaLonde et al. | | 700/95 |
| 6,493,761 B1 * | 12/2002 | Baker | | H04L 29/06 370/401 |
| 6,549,876 B1 * | 4/2003 | Yundt-Pacheco | | G01D 21/00 702/182 |
| 6,687,557 B2 * | 2/2004 | Ouchi | | 700/95 |
| 6,819,965 B2 * | 11/2004 | Beatty et al. | | 700/97 |
| 7,086,028 B1 * | 8/2006 | Davis | | G06F 17/5086 345/582 |
| 7,398,129 B2 * | 7/2008 | Ishii | | G06F 17/50 700/104 |
| 7,698,338 B2 * | 4/2010 | Hinshaw | | G06F 17/30477 707/754 |
| 8,027,745 B1 * | 9/2011 | Freeze | | 700/106 |
| 2002/0123812 A1 * | 9/2002 | Jayaram et al. | | 700/98 |
| 2003/0177254 A1 * | 9/2003 | Baker | | H04L 29/06 709/230 |
| 2005/0038821 A1 * | 2/2005 | Wallen | | G05B 19/4097 |
| 2006/0079989 A1 * | 4/2006 | Ishii | | G06F 17/50 700/182 |
| 2008/0228307 A1 * | 9/2008 | Mori | | G06Q 10/06 700/110 |
| 2008/0297847 A1 * | 12/2008 | Yamazaki et al. | | 358/1.15 |
| 2008/0300710 A1 * | 12/2008 | Cogswell et al. | | 700/105 |

* cited by examiner

*Primary Examiner* — Kidest Bahta
(74) *Attorney, Agent, or Firm* — Yee & Associates, P.C.

(57) ABSTRACT

An automated method for creating work instructions to manufacture a product. Monitoring for a user input modifying a model for the product is performed. Responsive to detecting the user input modifying the model for the product, a number of work instructions for a modification to the model of the product is identified. The model of the product is displayed with the modification on a display device. The number of work instructions is displayed on the display device in association with the modification of the model of the product.

34 Claims, 15 Drawing Sheets

APPARATUS AND METHOD FOR AUTOMATIC WORK INSTRUCTION GENERATION

BACKGROUND INFORMATION

1. Field

The present disclosure relates generally to an improved design and data processing system and, in particular, to a method and apparatus for designing and manufacturing products. Still more particularly, the present disclosure relates to a computer implemented method, apparatus, and computer usable program code for generating instructions to assemble products simultaneously with the evolution of the design.

2. Background

A product may take various forms such as, for example, a single part, a subassembly, or an entire product. As a non-limiting example, the product may take the form of a wing subassembly, an engine, an audio input system, a wing spar, a flight control system, or an entire aircraft.

In designing and manufacturing products, a number of different processes may be present. Initially, an engineer or designer may generate product data for a product. This product data may include, for example, without limitation, bills of materials, attributes, requirements, and other information relating to the product.

A computer aided design application may be used to create a drawing of the product with this product data. This drawing may take the form of a two-dimensional drawing or a three-dimensional drawing and/or model. The drawings may be used to form a model for the product. The product data may be combined or associated with the model to form a product definition.

With the product definition, process plans may be created to manufacture the product. These process plans also may include work instructions, which may be used to manufacture or assemble the product. The information in the product definition for the product and manufacturing processes for creating products may be used to create work instructions for the process plans to manufacture the product.

A work instruction may provide an explanation for a step or operations that may be performed to manufacture a product. Each product or configuration of a product may have a set of work instructions. The selection of a particular product and configuration may result in the work instructions for the selection being retrieved and presented for use in manufacturing the selected product or configuration of the product.

Another difficulty may occur in managing revisions or changes to the work instructions. If an organization or company has hundreds or thousands of products, storing and maintaining these work instructions may become difficult with the addition of new products and/or changes to existing products.

When a product is designed, the model of the product is analyzed to identify work instructions needed to manufacture the product. The work instructions are entered into a database of work instructions for various products that may be manufactured. This process of creating work instructions for products that are designed may take time and may increase the expense of designing new products.

When changes to a product occur, such as part changes or changes in requirements, the work instructions for the product and every configuration for that product may need to be updated. Currently, users maintaining work instructions may be required to look up the different documents for the work instructions affected by a change and to make those changes. Although this burden may be lightened by the fact that work instructions are stored electronically, much time and effort may still be needed to update these work instructions.

For example, an engineer or designer may make changes to a product. These changes may be made using a computer aided design program to manipulate or change a model of the product. After these changes are made, the work instructions for manufacturing the product may need to be revised.

These revisions are typically made in another database containing work instructions for different products that are manufactured. Changes may be made to the design of a product in response to a number of different factors such as, for example, improvements to functionality, customer requirements, part availability, and/or other suitable factors.

Once the design changes have been made to the model, those design changes are reviewed to determine what, if any, work instructions need to be revised. The changes to work instructions may take into account changes in desired configurations, changes to add or remove steps, changes to revise product requirements in the work instruction content, or other changes.

The time and expense needed to construct and/or identify changes to work instructions may increase the cost of a product. Further, with revisions to products, the time and cost of the updates to work instructions may not always be chargeable or billable to customers.

Therefore, it would be advantageous to have a method and apparatus that addresses at least one of the issues discussed above.

SUMMARY

In one advantageous embodiment, a method for creating work instructions to manufacture a product is present. Monitoring for a user input modifying a model for the product is performed. Responsive to detecting the user input modifying the model for the product, a number of work instructions for a modification to the model of the product is identified. The model of the product is displayed with the modification on a display device. The number of work instructions is displayed on the display device in association with the modification of the model of the product.

In another advantageous embodiment, a method is present for creating work instructions to manufacture a product. A user input is monitored for creating an interface for a plurality of parts for a model of the product. A number of work instructions is identified for attaching the plurality of parts to each other in the product in response to detecting the user input creating the interface for the plurality of parts. The plurality of parts is displayed on a display device. The number of work instructions is displayed on the display device in association with the plurality of parts for the product.

In another advantageous embodiment, a data processing system has a bus, a communications unit connected to the bus, a storage device connected to the bus in which the storage device includes program code; and a processor unit connected to the bus. The processor unit executes the program code to monitor for a user input modifying a model for a product; identify a number of work instructions for a modification to the model of the product in response to detecting the user input modifying the model for the product; display the model of the product with the modification on a display device; and display the number of work instructions on the display device in association with the modification of the model of the product.

In another advantageous embodiment, a data processing system comprises a bus, a communications unit connected to the bus, a storage device connected to the bus, and a processor unit connected to the bus. The storage device includes program code. The processor unit executes program code to monitor for a user input creating an interface for a plurality of parts for a model of a product. The processor unit executes program code to identify a number of work instructions for attaching the plurality of parts to each other in the product in response to detecting the user input creating the interface for the plurality of parts. The processor unit also executes program code to display the plurality of parts on a display device and present the number of work instructions on the display device in association with the plurality of parts for the product.

In another advantageous embodiment, a computer program product for creating work instructions to manufacture a product has a computer recordable storage medium with program code stored on the computer recordable storage medium. Program code is present for monitoring for a user input modifying a model for the product. Program code is also present for identifying a number of work instructions for a modification to the model of the product in response to detecting the user input modifying the model for the product. Program code is present for displaying the model of the product with the modification on a display device and for displaying the number of work instructions on the display device in association with the modification of the model of the product.

In yet another advantageous embodiment, a computer program is present for creating work instructions to manufacture a product. The computer program product comprises a computer recordable storage medium and program code stored on the computer recordable storage medium. Program code is present for monitoring for a user input creating an interface for a plurality of parts for a model of the product. Program code is present for identifying a number of work instructions for attaching the plurality of parts to each other in the product in response to detecting the user input creating the interface for the plurality of parts. Program code is present for displaying the plurality of parts on a display device. Program code is also present for displaying the number of work instructions on the display device in association with the plurality of parts for the product.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
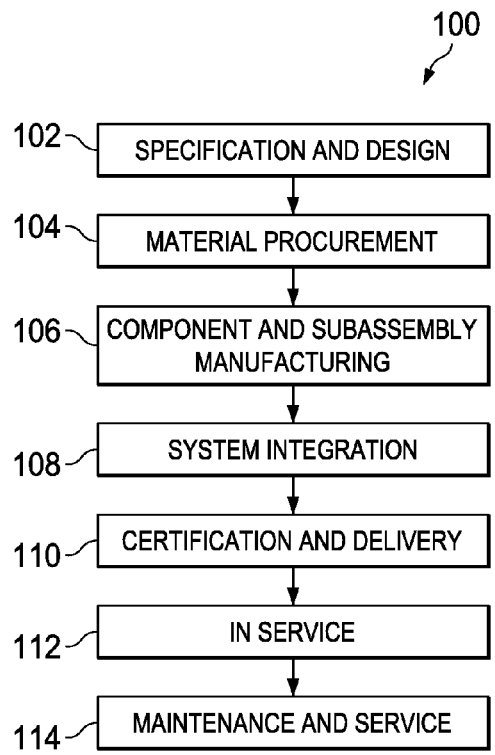
FIG. 1 is a diagram illustrating an aircraft manufacturing and service method in accordance with an advantageous embodiment.
Figure 2:
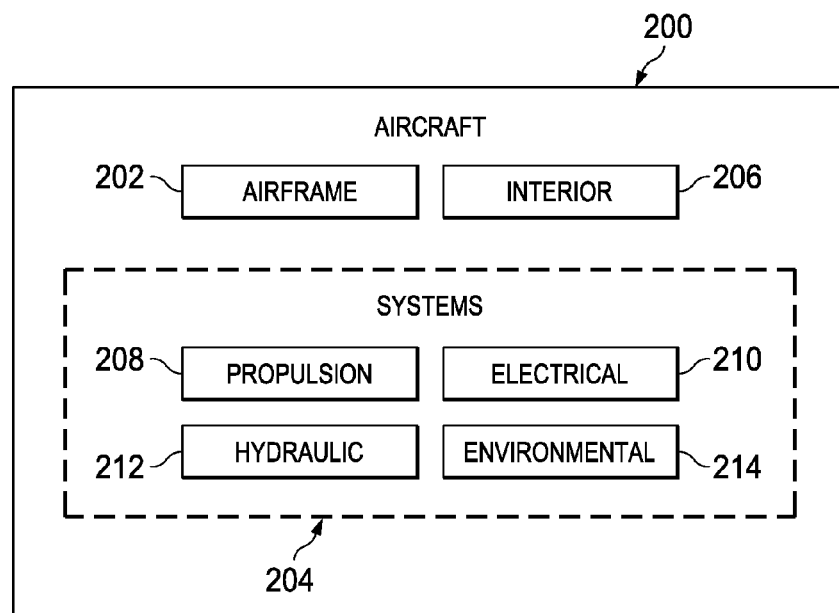
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, different advantageous embodiments may be employed to create work instructions during specification and design 102. Advantageous embodiments also may be implemented to obtain work instructions during component and subassembly manufacturing 106, system integration 108, and/or maintenance and service 114.

The different advantageous embodiments recognize and take into account that currently used systems for generating work instructions require an operator or other person to review models for products and generate work instructions from those models. The different advantageous embodiments also recognize and take into account that these instructions may be stored in a database for use when the products are manufactured.

The different advantageous embodiments also recognize and take into account that changes to products may be made by altering models based on various factors such as, for example, part availability, customer requests, customer specifications, improvements, and/or other suitable factors. These changes to the designs of the products may require updates and/or changes to instructions stored for use in manufacturing the products.

Thus, the different advantageous embodiments provide a method, apparatus, and computer program product for creating instructions to manufacture a product. The different advantageous embodiments may monitor for user input creating an interface between a plurality of parts to create an assembly during a design session. In response to detecting user input creating the interface, a number of work instructions may be automatically identified and displayed in the design session for coupling the plurality of parts to each other in the product.

The plurality of parts for a product may be presented or displayed on a display device. The instructions also may be displayed on the display device in association with the plurality of parts. In this manner, one or more of the different advantageous embodiments may automatically generate instructions while the product is being designed.

Figure 3:
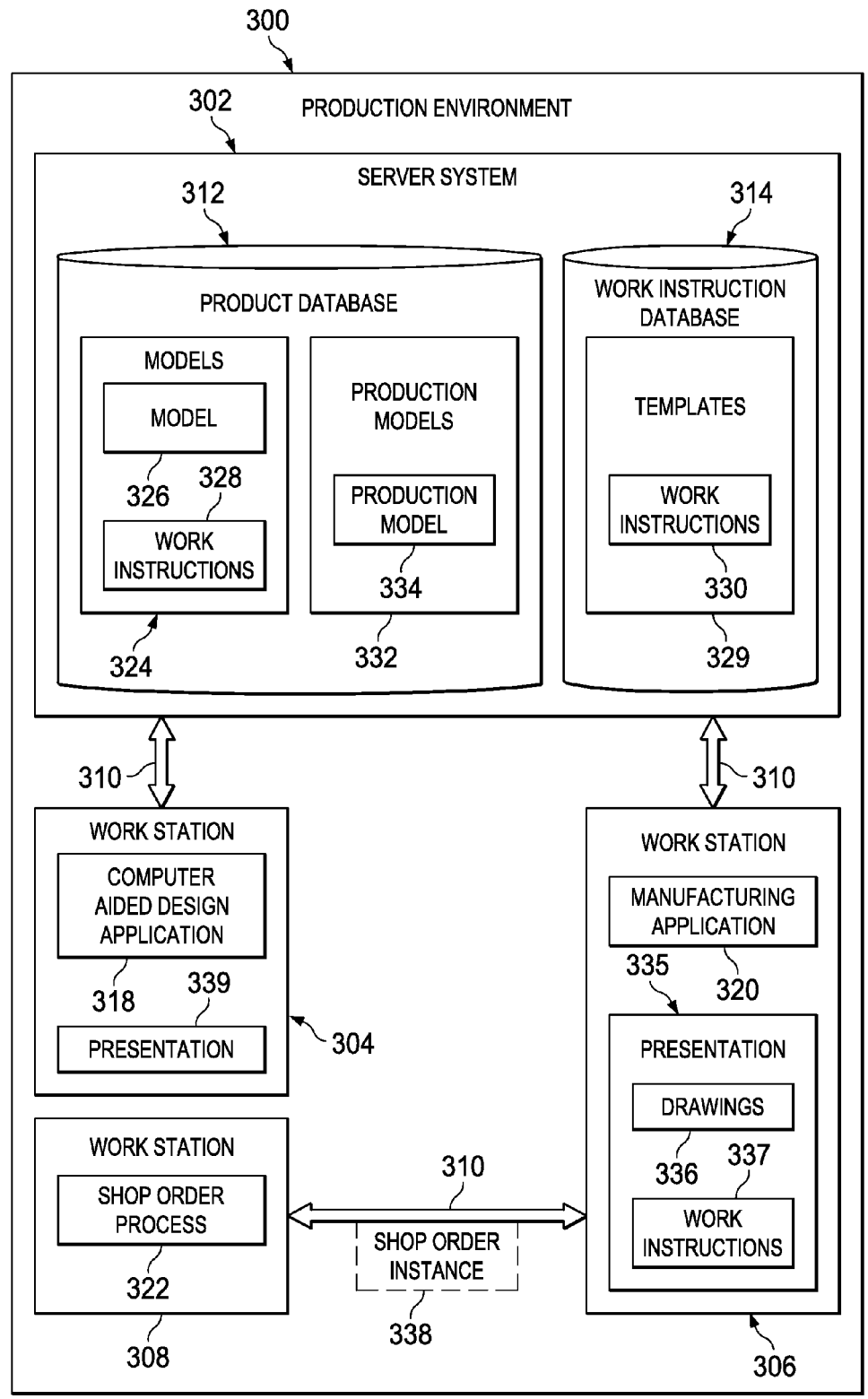
FIG. 3 is a diagram of a production environment in accordance with an advantageous embodiment.

With reference now to FIG. 3, a diagram of a production environment is depicted in accordance with an advantageous embodiment. In this illustrative example, production environment 300 may be an example of a production environment that may be used in aircraft manufacturing and service method 100 in FIG. 1 to produce aircraft 200 in FIG. 2.

Production environment 300 may include server system 302, work station 304, work station 306, and work station 308. In these examples, the different hardware components may be in communication with each other through network 310. Network 310 may comprise communications links such as, for example, without limitation, wires, optical fibers, wireless links, and/or other suitable types of communications links. Network 310 provides communications between the different hardware components illustrated in production environment 300.

In this example, server system 302 may be a number of computers and may provide access to product database 312 and work instruction database 314. Work station 304 may execute computer aided design application 318. Work station 306 may execute manufacturing application 320, and work station 308 may execute shop order process 322. Additionally, work station 304 may execute manufacturing application 320 and generate presentation 335 in addition to computer aided design application 318.

In these examples, a user at work station 304 may operate computer aided design application 318 to create models 324 in product database 312. Models 324 may include model 326.

Model 326 is a two- and/or three-dimensional model of a product and also may contain other information describing the product. In these illustrative examples, model 326 also may contain work instructions 328. Other information that may be present in model 326 includes, for example, without limitation, build materials, standard or non-standard attributes, key attributes, and other suitable data or information needed to create model 326 for a product in models 324.

A user at work station 304 may operate computer aided design application 318 to create model 326 for a product. For example, computer aided design application 318 may be used to create a three-dimensional model of structural components such as, for example, without limitation, fuselage sections, bulkheads, frames, wing sections, landing gear sections, crew platforms, lavatories, galleys, cockpits, and/or any other suitable components for an aircraft. These models may be stored in models 324 in product database 312.

While creating model 326, computer aided design application 318 also generates work instructions 328 for model 326. Work instructions 328 are identified and created while model 326 is generated and/or modified. While model 326 is being created and/or modified, presentation 339 may be displayed at workstation 304. Presentation 339 may be a display of parts and work instructions identified for parts in model 326.

The identification of work instructions 328 may occur each time a plurality of parts is joined to each other in model 326. Work instructions 328 also may be changed when parts are removed or are unjoined from other parts in model 326. In this manner, one or more different advantageous embodiments may provide a capability to generate work instructions as a product is being designed. These work instructions may be presented with the parts. In some cases, the presentation of work instructions identified for model 326 may be omitted.

Work instructions 328 may be identified from work instruction database 314. Work instruction database 314 contains templates 329. Templates 329 are a standard set of one or more work instructions from work instructions 330 that may be used to manufacture a product. Each template in templates 329 contains a number of work instructions 330.

Work instructions 330 within templates 329 are work instructions which may be reused. In other words, work instructions 330 may be a set of work instructions that is general in nature for manufacturing a product type. For example, work instructions 330 may include instructions as to how to couple a bracket to a structure. This type of work instruction may be reused for many different products.

Work instructions 328 are a subset of work instructions 330. Work instructions 328 are included as part of model 326. In including work instructions 328 in model 326, work instructions 328 may take the form of actual work instructions. Actual work instructions are work instructions that have been included in a model for use in manufacturing a product.

In other advantageous embodiments, work instructions 328 may be included in model 326 as pointers to work instructions that may be located in another location. For example, work instructions 328 may be a number of pointers to work instructions 330 in templates 329 within work instruction database 314. In yet other advantageous embodiments, work instructions 328 may be a pointer to work instructions located in a document within product database 312, or some other suitable location.

When the user is done working with model 326, model 326 is saved in models 324. When models 324 for products are ready for manufacturing, models 324 may be marked as production models 332. This designation between models 324 and production models 332 may avoid manufacturing of a product using a model that is not ready or still being revised. Production models 332 may be accessed by manufacturing application 320. In the different advantageous embodiments, manufacturing application 320 may not be capable of accessing models 324. As a result, manufacturing parts using incomplete models may be avoided.

Manufacturing application 320 may process a production model, such as production model 334, in production models 332 to generate presentation 335. Presentation 335 may be displayed and/or otherwise presented to a user on a display device at work station 306. Presentation 335 may include drawings 336 and work instructions 337. Work instructions 337 may be displayed in association with parts within drawings 336.

Manufacturing application 320 may be, or may include, a computer aided design application used to present and display work instructions 337 from production models 332. In other advantageous embodiments, manufacturing application 320 may generate presentations for display on work stations that do not have computer aided design applications.

In some advantageous embodiments, manufacturing application 320 may generate shop order instance 338 and send shop order instance 338 to work station 308 for shop order process 322. Shop order instance 338 may form presentation 335, and may be a file, document, or some other data structure containing information from presentation 335. Shop order process 322 presents shop order instance 338 to a user for use in manufacturing the product. Shop order process 322 may be a computer aided design application, a viewer program for models, or some other suitable application or program code capable of presenting shop order instance 338.

Shop order instance 338 may be for a product for assembly with other components to complete another product. In yet another example, the product may be a subassembly for an aircraft. In yet other examples, shop order instance 338 may define a process for use in repairing an existing product. One example of a process for use to repair another product may be replacing a damaged flap on an aircraft. In these illustrative examples, work station 308 may be located on a shop floor.

In this manner, when updates are made to models such as, for example, models within models 324, work instructions for those updates may be automatically generated as the design changes occur.

When creating new products, models for those products have instructions generated as those models are developed and/or changed. As a result, when a product is finished and ready for manufacturing, work instructions for that product are already generated using computer aided design application 318. Production of the part may then be performed by designating the model as a production model in product database 312.

The illustration of production environment 300 is not meant to imply physical or architectural limitations to the manner in which different advantageous embodiments may be implemented. For example, other components in addition to, or in place of, the ones illustrated may be used in different implementations. Further, some components may be unnecessary.

For example, additional work stations, in addition to work stations 304, 306, and 308, may be present within production environment 300. In other advantageous embodiments, shop order process 322 may be unnecessary if computer aided design application processes are present in the different work stations. In other advantageous embodiments, it may not be necessary to have separate workstations 304 and 306 if manufacturing application 320 is included in computer aided design application 318. In other words, both computer aided design application 318 and manufacturing application 320 may execute on the same computer.

As another example, although product database 312 and work instruction database 314 are illustrated as separate components, these databases may be combined or further divided into additional databases. In other advantageous embodiments, the information stored in these representations of databases may be stored in a single database. As another example, additional product databases, in addition to product database 312, may be present in some advantageous embodiments. In still other advantageous embodiments, a particular database may be distributed over various servers and locations.

Figure 4:
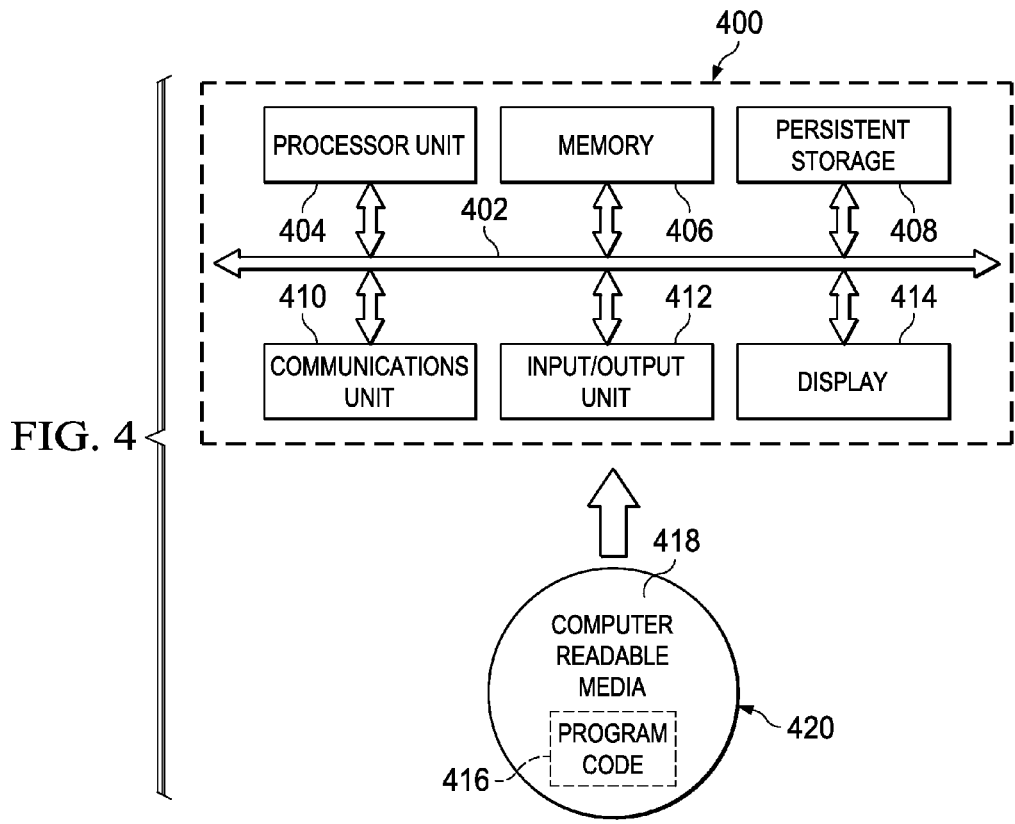
FIG. 4 is a diagram of a data processing system in accordance with an illustrative embodiment.

Turning now to FIG. 4, a diagram of a data processing system is depicted in accordance with an illustrative embodiment. Data processing system 400 may be used to implement various computers and/or devices used in the different advantageous embodiments. For example, data processing system 400 may be used within production environment 300 in FIG. 3. Data processing system 400 may be used to implement servers within server system 302, work station 304, work station 306, and/or work station 308 in FIG. 3.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device.

A storage device, as used herein, is hardware that is capable of storing computer program code in the functional form and/or data. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form such as, for example, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory, that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 406 or a cache, such as found in an interface and memory controller hub, that may be present in communications fabric 402.

Figure 5:
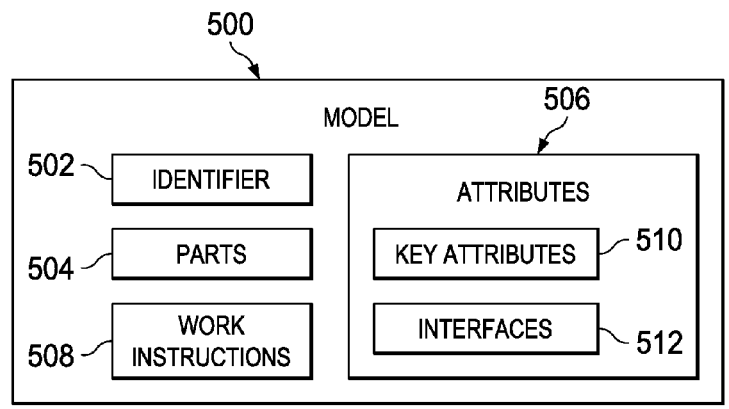
FIG. 5 is a diagram illustrating a model in accordance with an advantageous embodiment.

Turning next to FIG. 5, a diagram illustrating a model is depicted in accordance with an advantageous embodiment. In this example, model 500 is an example of one implementation for model 326 within models 324 in FIG. 3. Model 500 also may be an example of a model within production models 332. Model 500 includes identifier 502, parts 504, attributes 506, and work instructions 508. Identifier 502 may be a unique identifier to distinguish model 500 from other models within models 324 in FIG. 3.

Parts 504 contain information for drawing parts that form the product for model 500. Parts 504 contain the information needed to display those parts in two and/or three dimensions when model 500 is processed by a computer aided design application or other application capable of displaying model 500 on a display device.

Attributes 506 contain information about parts 504 in these examples. Attributes 506 may include key attributes 510 and interfaces 512. Key attributes 510 may be used to identify work instructions for joining parts 504 to each other at interfaces 512. Key attributes 510 may be added to model 500 or may be selected from other attributes within attributes 506.

Key attributes 510 may include, for example, without limitation, a part number, a part name, a part description, a part type, Cartesian coordinates, part interface, what the part mates up with, the type of attachment, an airplane section, material, or some other suitable attribute. These attributes may be used to generate instructions for installation, assembly, and/or fabrication of parts.

Interfaces 512 may identify a joining or coupling of parts within parts 504. Attributes 506 also may include other information. For example, attributes 506 may identify a number of holes to be drilled, a size of holes, a type of fastener, whether a seal is to be used, a sealant type, an electrical bonding class, an electrical bonding type, whether to use a counter-sink, a process specification call out, and/or other information that may be used to describe or define parts 504.

Work instructions 508 in model 500 may be work instructions for installation, assembly, fabrication, or some other suitable operation that may be performed for the parts. For example, work instructions 508 may provide instructions on installing a wire harness run. As stringer clip standoffs and brackets are created for a model, key attributes for each part may be used to identify instructions to install these components.

With a mechanical assembly design, as parts are created, work instructions may be identified on how to assemble the parts. For example, work instructions 508 may provide work instructions on fastening one part to another part using a number of fasteners that may be placed through holes formed in the parts.

In another example, work instructions 508 may provide work instructions on fabricating components for use. For example, if a bracket is designed with a 90 degree bend, work instructions 508 may indicate that the metal should be bent to around 90 degrees. If a 0.75 radius is created on the bracket corner, work instructions 508 may be identified to mill a corner radius to around 0.75 within a selected tolerance.

Figure 6:
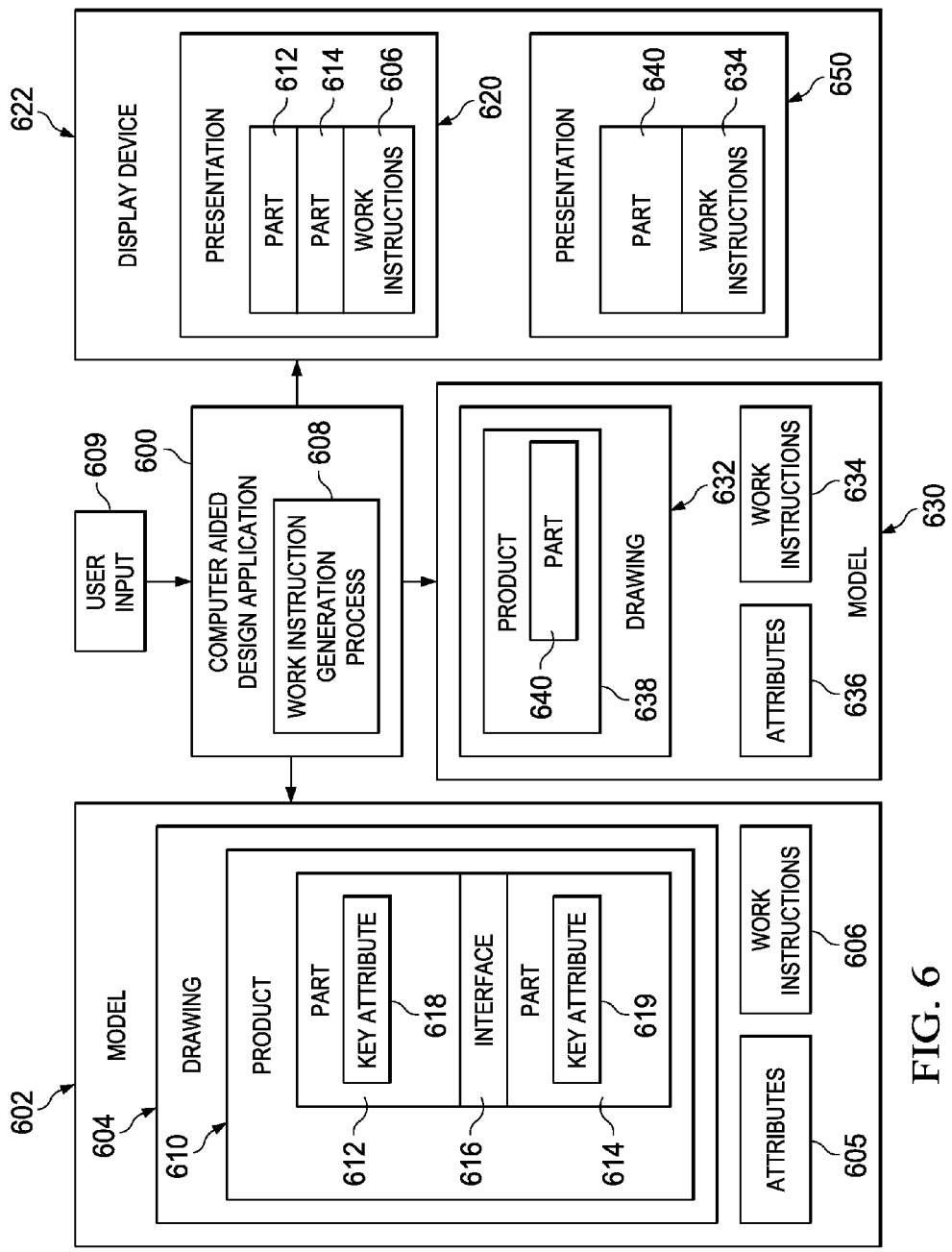
FIG. 6 is a diagram illustrating work instruction creation for a product in accordance with an advantageous embodiment.

With reference now to FIG. 6, a diagram illustrating work instruction creation for a product is depicted in accordance with an advantageous embodiment. In this example, computer aided design application 600 is an example of computer aided design application 318 in FIG. 3.

Computer aided design application 600 may be used to create and/or modify model 602. Model 602 is a model of a product that may be manufactured. In this example, model 602 includes drawing 604, work instructions 606, and attributes 605. Work instructions 606 are identified by work instruction generation process 608 in computer aided design application 600 during manipulation of model 602. In this example, drawing 604 may be a two-dimensional and/or three-dimensional drawing of product 610.

Product 610 includes part 612 and part 614 in this illustrative example. Part 612 and part 614 are coupled to each other at interface 616. An interface is a connection between two or more parts.

For example, part 612 and part 614 may be each part of a wire harness assembly. Part 612 may mate with part 614 to form interface 616. Work instruction generation process 608 monitors user input 609 to model 602 for generating interface 616. When a user generates user input 609 to connect part 612 to part 614 to create interface 616 in model 602, work instruction generation process 608 detects interface 616. In response to detecting the generation of interface 616, work instruction generation process 608 identifies work instructions 606 for assembling part 612 and part 614 to form product 610.

Work instruction generation process 608 searches a database such as, for example, work instruction database 314 in FIG. 3 for a match for part 612 and part 614 with interface 616. Work instructions corresponding to this match are used to form work instructions 606 for model 602.

Computer aided design application 600 generates presentation 620 on display device 622. Presentation 620 includes part 612, part 614, and work instructions 606. The presentation of part 612 and part 614 may be two dimensional and/or three dimensional on display device 622. The presentation of work instructions 606 are in association with parts 612 and 614.

A user may manipulate presentation 620 in creating and/or modifying model 602. In other words, presentation 620 changes as the user manipulates parts in model 602. Presentation 620 may change as the user makes changes to model 602. As changes are made to model 602 that may add or remove interfaces, presentation 620 may change to illustrate the changes in the parts and/or work instructions associated with those parts.

If a user generates a new interface with additional parts through user input to presentation 620, work instruction generation process 608 may find additional instructions for inclusion in work instructions 606. These new instructions also are displayed in association with the new parts in presentation 620. If a user removes parts or changes interfaces, instructions may be removed or changed in work instructions 606 as presented in presentation 620.

Presentation 620 may be generated on any data processing system with a software component capable of presenting model 602. For example, without limitation, presentation 620 may be presented on work station 304 using computer aided design application 318 and on work station 306 using manufacturing application 320 in FIG. 3.

Further, presentation 620 also may be presented on work station 308 using shop order process 322 in FIG. 3. These software components may be, for example, computer aided design programs, viewers from models generated by computer aided design programs, or other software components. For example, presentation 620 may be saved as an image or other type of file for presentation using a non-computer aided design related software component.

A user may see the work instructions that will be presented in association with parts for manufacturing. In some advantageous embodiments, a user may wish to see fewer instructions or no instructions, depending on the particular implementation. For example, presentation 620 may be in stages in which successive drawings show additional parts and/or interfaces along with the instructions for the new parts and/or interfaces that are displayed in different drawings.

In identifying work instructions 606, key attributes, such as key attribute 618 and key attribute 619 in part 612 and part 614, respectively, may be used in identifying work instructions 606. Key attributes 618 and 619 may be key attributes within attributes 605. Although in these examples each part has a single key attribute, other parts may have more than one key attribute, depending on the particular implementation.

Key attributes are used to identify parts and may be used to search a work instruction database for work instructions used to generate the particular interface between the parts that have been joined. These key attributes also may be used to identify the manner in which work instructions 606 are to be presented, the sequence of work instructions, and other suitable information to be obtained from work instruction database 314 in FIG. 3. Key attribute 618 and key attribute 619 may be information identifying part 612 and part 614 as being wire harness assemblies.

When completed, model 602 may be stored in a database such as, for example, product database 312 in FIG. 3. Model 602 also may be used to manufacture product 610. Model 602 also may be modified at a later point in time. Modification of model 602 may result in work instructions being added, removed, and/or changed within work instructions 606 for model 602.

As another example, user input 609 may be used to create and/or modify model 630. In this example, model 630 is a model of another product that may be manufactured. Model 630 includes drawing 632, work instructions 634, and attributes 636. As with model 602, work instructions 634 may be identified by work instruction generation process 608 in computer aided design application 600 during the manipulation of model 630.

In this example, drawing 632 may be a two-dimensional and/or three-dimensional model of product 638. In this illustrative example, product 638 may take the form of part 640. Attributes 636 may be different attributes of part 640 as part 640 is created. For example, without limitation, if part 640 is a bracket, attributes 636 may include holes and a bend angle for part 640 if the user modifies part 640 to include holes and a bend.

User input 609 may be received as a modification to model 630. In these examples, the modification may be a change to part 640. For example, as attributes 636 are created, work instruction generation process 608 may identify work instructions 634 needed to manufacture part 640. As attributes are added to attributes 636, work instructions 634 are identified and presented to the user on display device 622 in presentation 650.

In this example, presentation 650 may display part 640 and work instructions 634. Work instructions 634 may be displayed in association with the modification. For example, if a modification is the addition of a hole, work instructions 634 may be displayed in association with the hole.

In a similar fashion, when model 630 is completed, this model may be stored in a database. Further, model 630 may be modified at a later point in time. Also, model 630 may be used to manufacture part 640.

Figure 7:
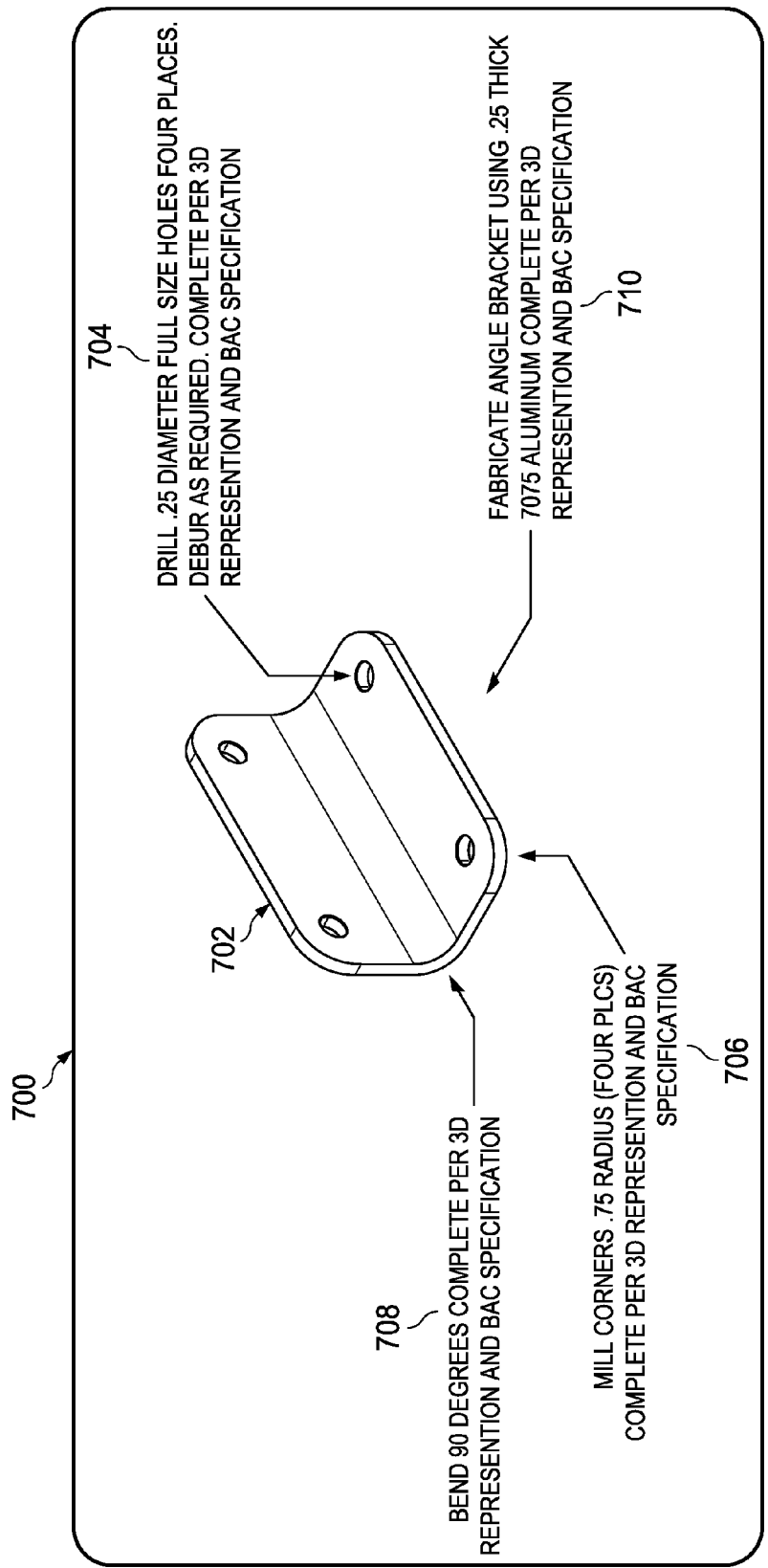
FIG. 7 is a diagram of a presentation of a product with work instructions in accordance with an advantageous embodiment.

With reference now to FIG. 7, a diagram of a presentation of a product with work instructions is depicted in accordance with an advantageous embodiment. In this example, presentation 700 is an example of a presentation, such as presentation 335 in FIG. 3 and/or presentation 620 in FIG. 6.

As illustrated, presentation 700 contains an illustration of part 702 with work instructions 704, 706, 708, and 710. These different work instructions are examples of work instructions that may be presented within presentation 335 in FIG. 3 during a design session in which part 702 is created. Further, presentation 700 also may be a presentation that is presented when part 702 is to be manufactured.

Figure 8:
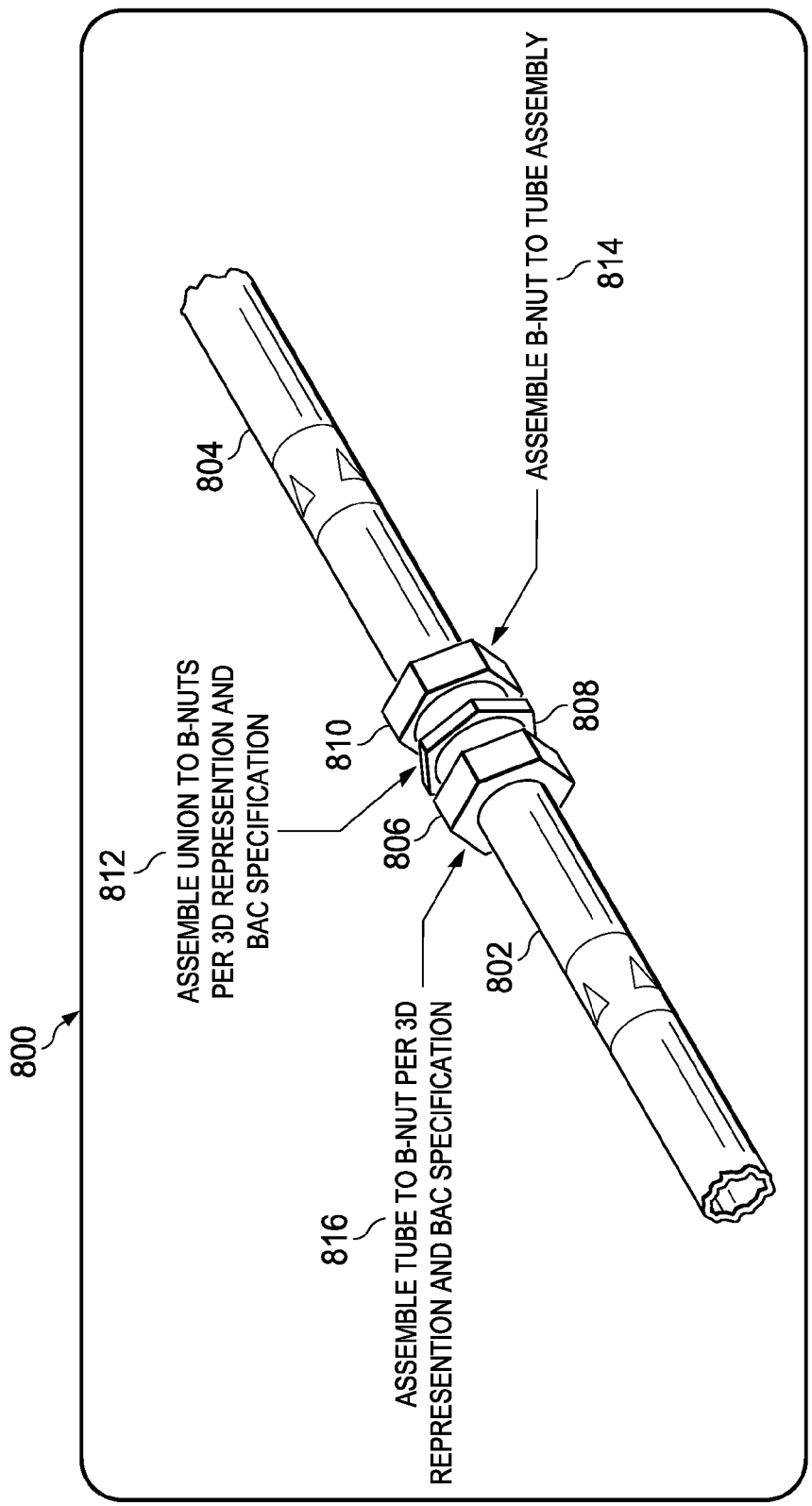
FIG. 8 is a diagram of a presentation containing parts and work instructions in accordance with an advantageous embodiment.

Turning next to FIG. 8, a diagram of a presentation containing parts and work instructions is depicted in accordance with an advantageous embodiment. In this example, presentation 800 is another example of presentation 335 in FIG. 3 or presentation 620 in FIG. 6. Presentation 800 may be generated during a design process, such as that shown in presentation 620 in FIG. 6 or when a product is ready to be manufactured as with presentation 335 in FIG. 3. In this example, parts 802, 804, 806, 808, and 810 are illustrated for assembly with work instructions 812, 814, and 816.

Figure 9:
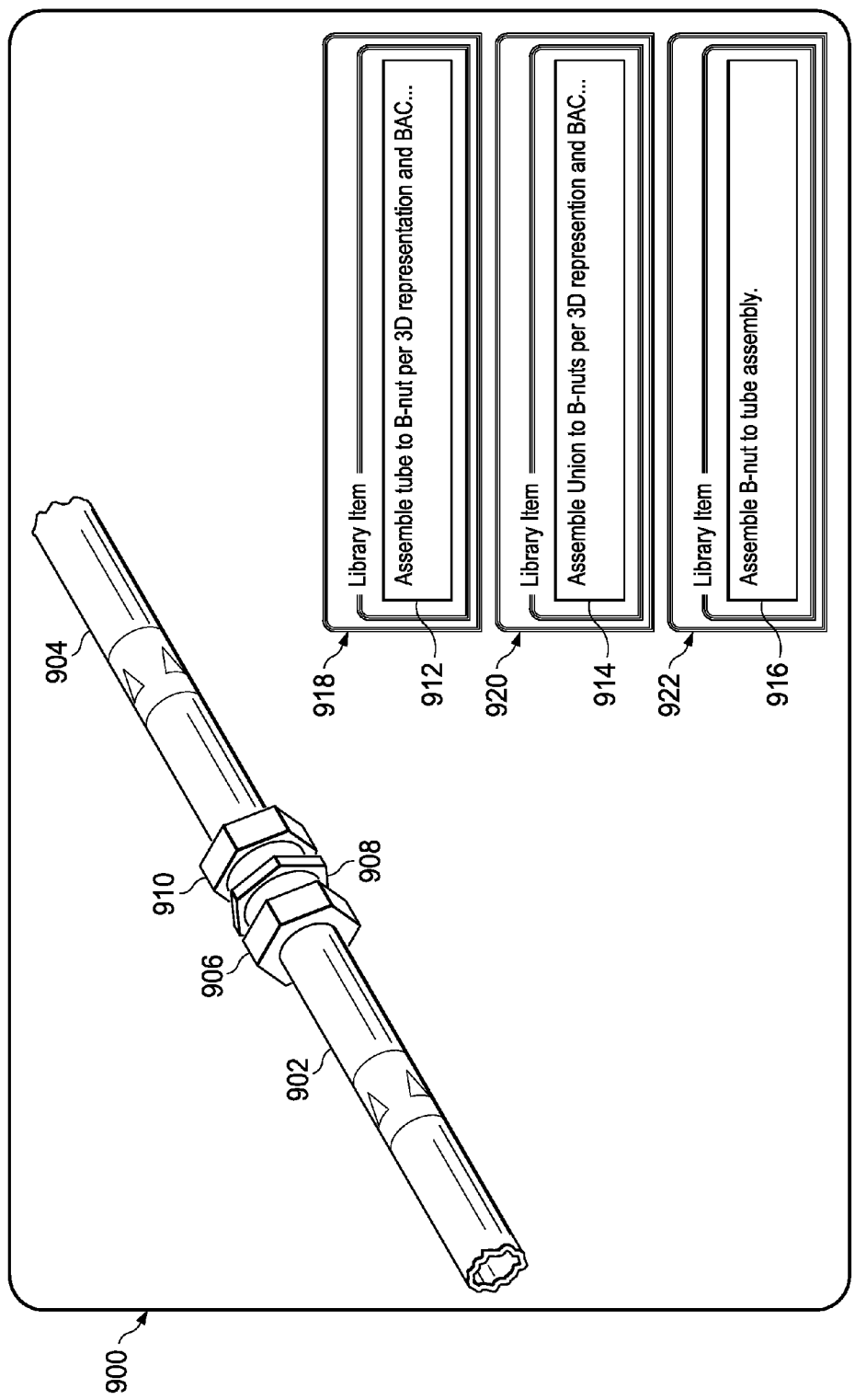
FIG. 9 is a diagram of a presentation with work instructions in accordance with an advantageous embodiment.

Turning next to FIG. 9, a diagram of a presentation with work instructions is depicted in accordance with an advantageous embodiment. In this example, presentation 900 is an example of a presentation such as, for example, presentation 335 in FIG. 3 and/or presentation 620 in FIG. 6. Parts 902, 904, 906, 908, and 910 are shown in association with work instructions 912, 914, and 916. In this example, work instructions 912, 914, and 916 are presented in boxes 918, 920, and 922 in presentation 900.

Figure 10:
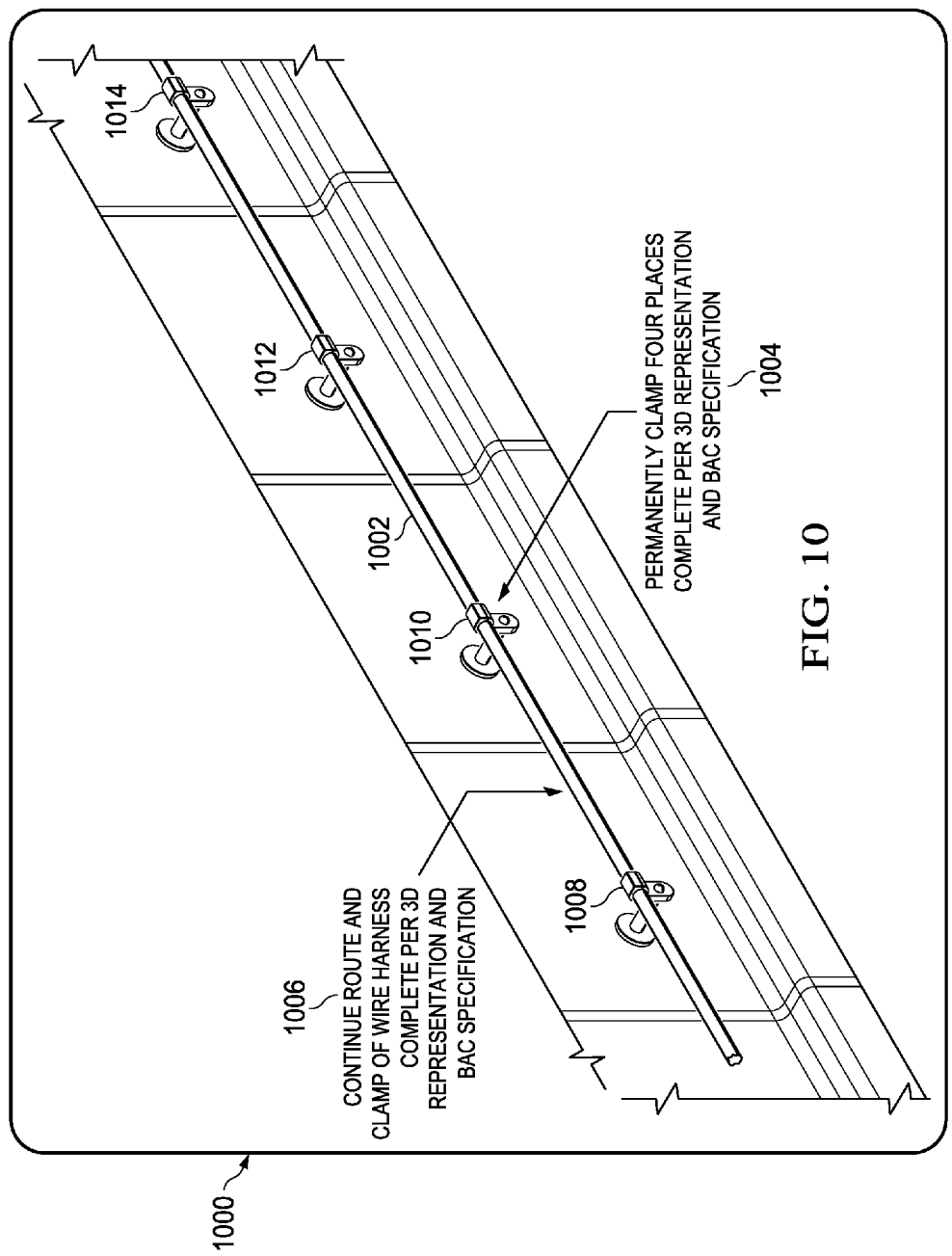
FIG. 10 is a diagram of a presentation of parts with work instructions in accordance with an advantageous embodiment.

In FIG. 10, another diagram of a presentation of parts with work instructions is depicted in accordance with an advantageous embodiment. In this example, presentation 1000 is an example of a presentation, such as presentation 335 in FIG. 3 and/or presentation 620 in FIG. 6. Presentation 1000 illustrates wire harness 1002 and work instructions 1004 and 1006. Work instructions 1004 and 1006 provide directions on installing wire harness 1002. In this example, these work instructions are for assembling parts 1008, 1010, 1012, and 1014.

Figure 11:
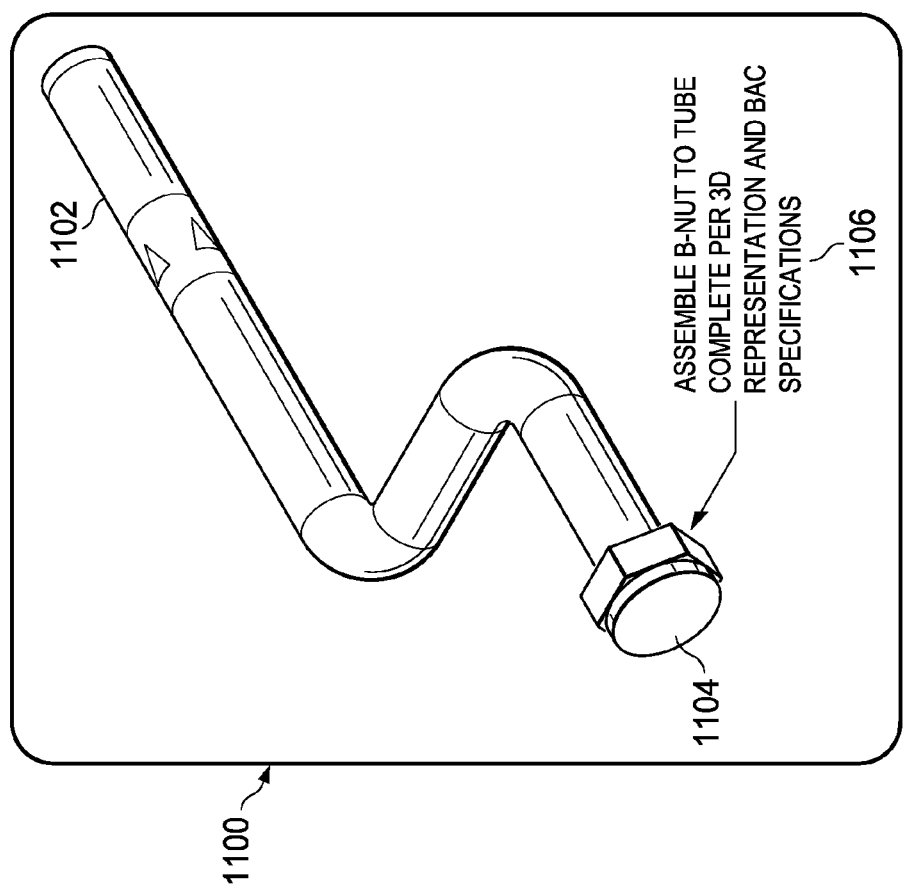
FIG. 11 is a diagram of a presentation illustrating parts and work instructions in accordance with an advantageous embodiment.
Figure 12:
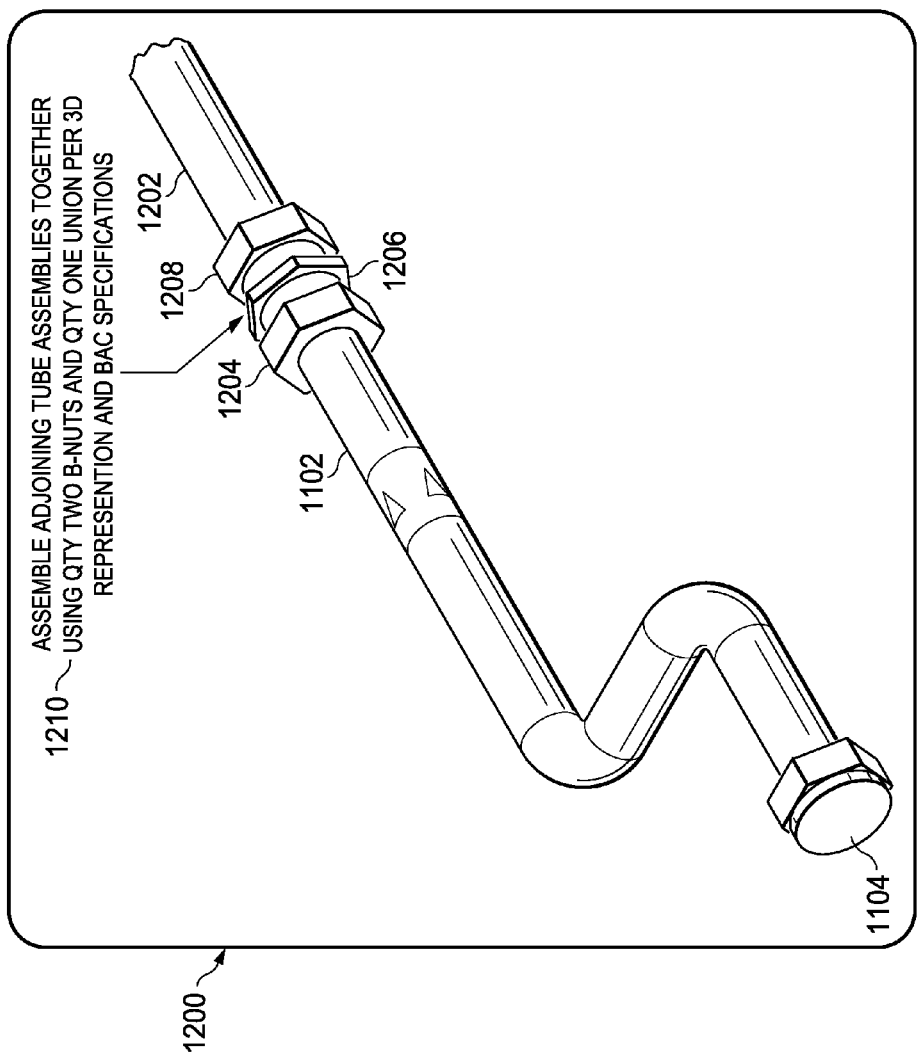
FIG. 12 is a diagram of a presentation in a second stage in the assembly of a product in accordance with an advantageous embodiment.
Figure 13:
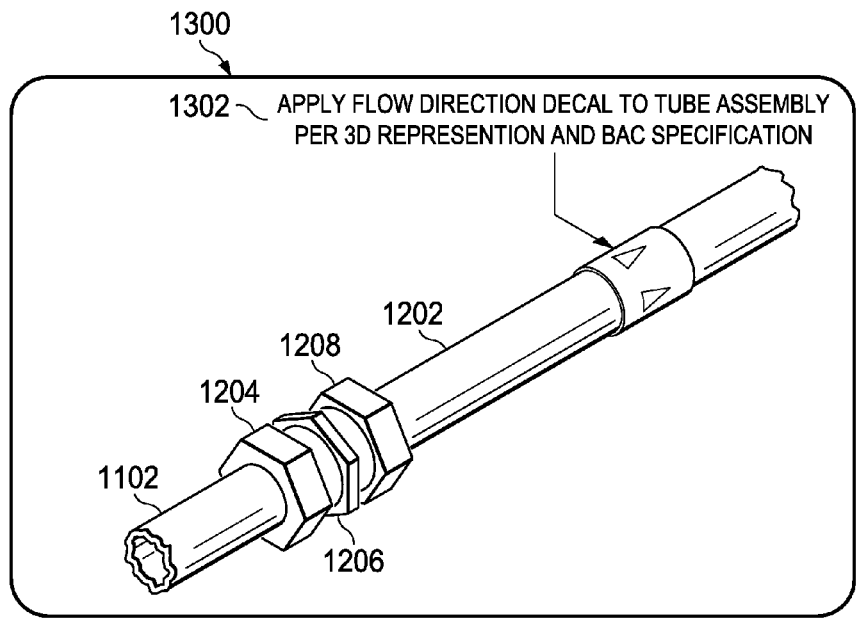
FIG. 13 is a diagram of a presentation in a third stage in the assembly of a product in accordance with an advantageous embodiment.

Turning now to FIGS. 11-13, diagrams illustrating presentations for assembling a product in stages is depicted in accordance with an advantageous embodiment. These presentations may be examples of presentation 335 in FIG. 3 and/or presentation 620 in FIG. 6.

In FIG. 11, presentation 1100 illustrates part 1102, part 1104, and work instruction 1106. In FIG. 12, presentation 1200 is a second stage in which part 1102 may be joined to part 1202 using parts 1204, 1206, and 1208. In presentation 1200, work instruction 1210 is illustrated for this assembly. In FIG. 13, presentation 1300 is a third stage in the assembly of the product in which work instruction 1302 is illustrated.

Figure 14:
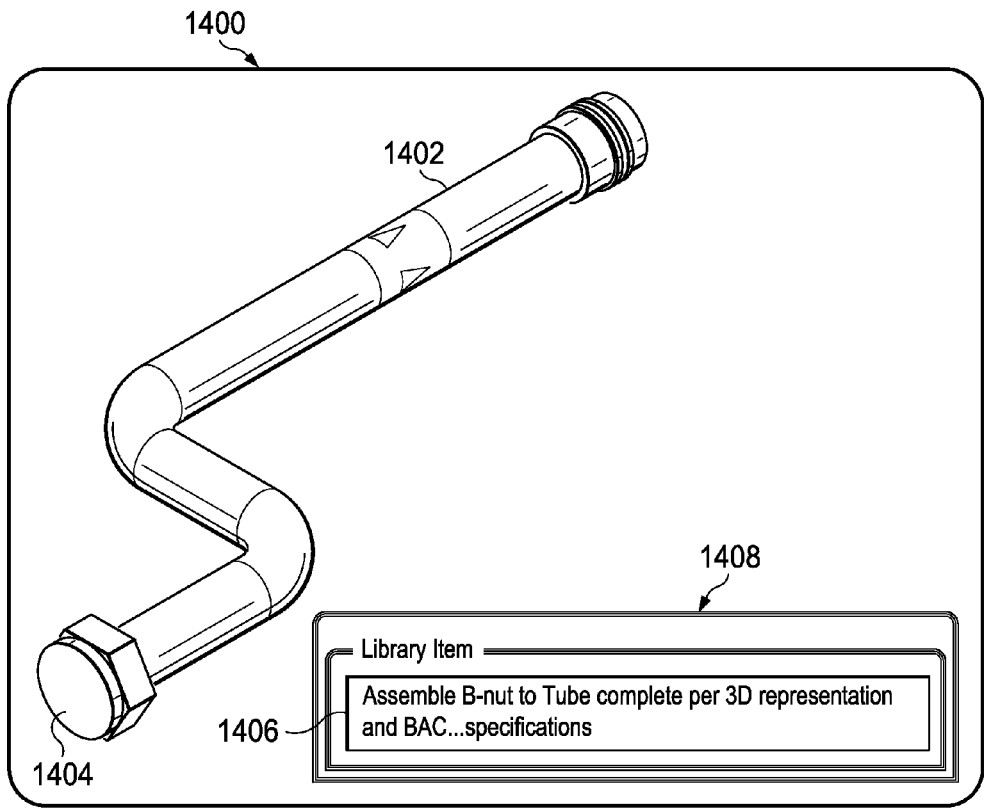
FIG. 14 is a diagram of a presentation illustrating parts with work instructions in accordance with an advantageous embodiment.
Figure 15:
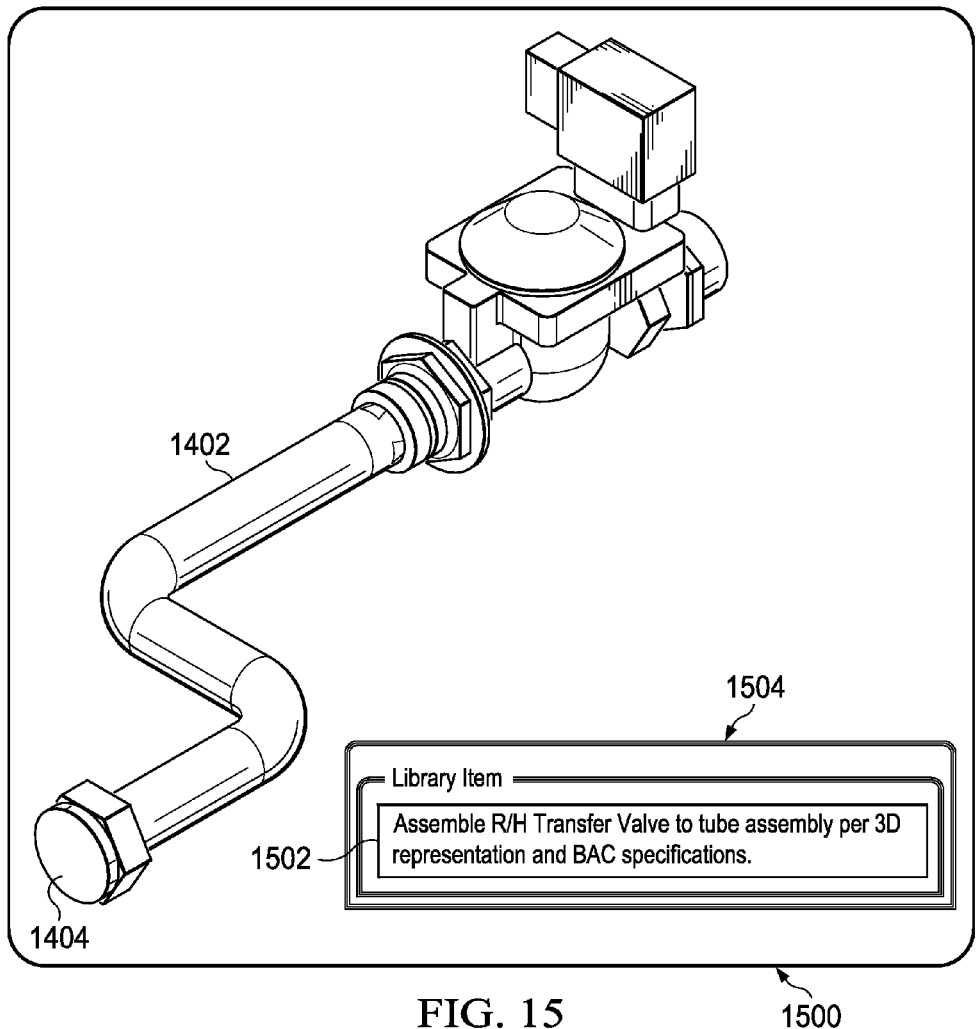
FIG. 15 is a diagram of a second stage of assembly for the product in accordance with an advantageous embodiment.

With reference now to FIGS. 14 and 15, illustrations of presentations for stages in manufacturing a product are depicted in accordance with an advantageous embodiment. These presentations are examples of presentations such as, for example, presentation 335 in FIG. 3 and/or presentation 620 in FIG. 6.

In FIG. 14, presentation 1400 illustrates part 1402 and part 1404 with work instruction 1406 in box 1408 to assemble these two parts. In FIG. 15, a second stage of assembly for the product is illustrated in which parts 1402 and 1404 are connected to part 1500 using instruction 1502 in box 1504.

The illustrations of presentations in FIGS. 7-15 are for purposes of illustrating examples of how presentations may be implemented. These examples are not meant to imply physical or architectural limitations to the manner in which other presentations may be presented.

Figure 16:
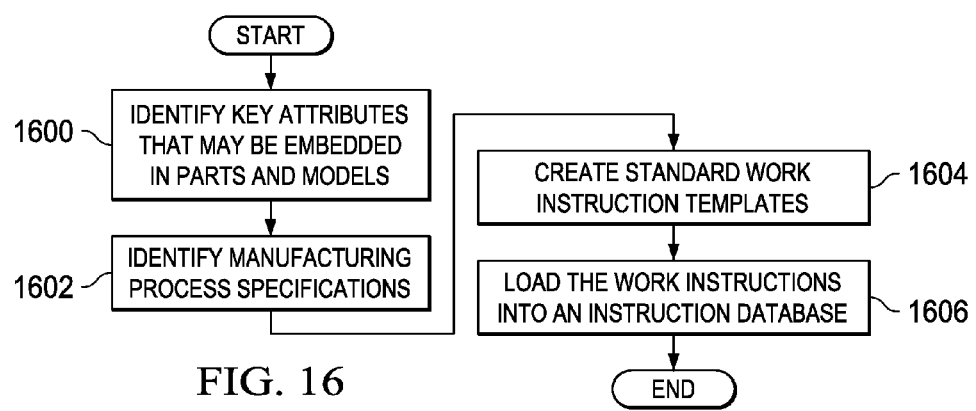
FIG. 16 is a flowchart of a process for setting up a production environment in accordance with an advantageous embodiment.

With reference now to FIG. 16, a flowchart of a process for setting up a production environment is depicted in accordance with an advantageous embodiment. The flowchart in FIG. 16 is an example of a process that may be implemented in production environment 300 in FIG. 3 to provide a capability of automatically generating instructions during the design and/or modification of a model for a part.

The process begins by identifying key attributes that may be embedded in parts and/or models (operation 1600). Next, the process identifies manufacturing process specifications (operation 1602). This operation may be used to define standard process requirements to follow for producing a product. Work instructions may be generated for a particular model based on the process specifications associated with the product being designed. Standard work instruction templates are created (operation 1604). This operation creates a standard set of work instructions for each type of part combination and interface that may be contemplated. These instructions may be identified using key attributes.

The process then loads the work instructions into an instruction database (operation 1606), with the process terminating thereafter. These instructions may be loaded into an instruction database such as, for example, work instruction database 314 as work instructions 330 in FIG. 3.

The key attributes identified in operation 1600 may be used by a work instruction generation process to identify the placement of instructions relative to parts as they are placed and/or manipulated during a design session.

Further, these key attributes also may be used to identify a sequence and a type of annotation for parts with the work instructions. The sequence also may identify a particular sequence of presentations that may be used to progressively present new parts for a product with the work instructions. For example, the identification of key attributes may be used to identify where to display a work instruction relative to parts that have been joined to create an interface.

Figure 17:
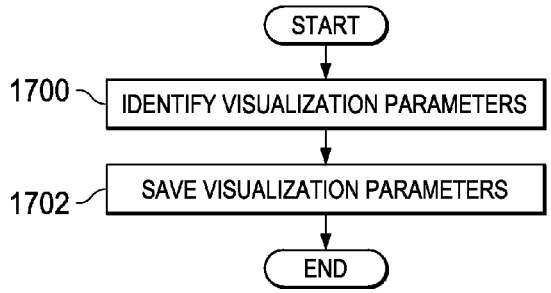
FIG. 17 is a flowchart of a process for generating settings for a work instruction generation process in accordance with an advantageous embodiment.

With reference now to FIG. 17, a flowchart of a process for generating settings for a work instruction generation process is depicted in accordance with an advantageous embodiment. The process illustrated in FIG. 17 may be implemented in a computer aided design application with a work instruction generation process to set various parameters. This process may be implemented in a software component such as, for example, computer aided design application 318 in FIG. 3. In these examples, this process may be initialized after a user determines requirements for manufacturing a product. These requirements may include, for example, without limitation, identifying manufacturing processes and requirements for those processes.

The process begins by identifying visualization parameters (operation 1700). These parameters may be identified from user input received by the process. These parameters may be identified based on a number of different factors. For example, manufacturing requirements may be used to determine how work instructions may be presented. The visualization parameters may be a number of parameters that identify how work instructions are to be presented to a user.

For example, the user may identify the type of illustration for work instructions. For example, the illustration may show all of the parts with work instructions shown in locations associated with the parts to manufacture the product. In another example, a progressive display of parts may be shown such that additional parts are included in each successive display along with the work instructions needed to assemble the parts to form the product.

The visualization parameters also may include a population frequency. This parameter may identify a situation in which the same part may be used in a number of different locations. This parameter may be set to allow a user to call out a manufacturing process annotation in a more generalized fashion.

For example, the process may provide a dialogue box that states "Locate and Install Stringer Clips 10 places from Stringer 17 through 27 using applicable shop distribution standards complete per three dimensional geometrical representation and BAC . . . specification".

Alternately, the user could choose to have a standard work instruction that reads "Locate and Install Stringer Clip P/N . . . attaching to Stringer 17 at STA 305, WL 205, RBL 85 using applicable shop distribution standards complete per three dimensional geometrical representation and BAC . . . specification" called out exclusively at each location.

As another example, position placement may be a visualization parameter used to identify where an instruction is displayed on a screen with respect to a number of parts to which the part is associated. Other visualization parameters may include, for example, without limitation, part color, intensity, transparency, background color, intensity of background, transparency of background, persistency of parts, textbox location, textbox size, font, color, textbox persistency, and/or other suitable parameters.

The visualization parameters are saved (operation 1702), with the process terminating thereafter. These parameters may be used in generating presentations, such as presentation 335 in FIG. 3 and/or presentation 620 in FIG. 6.

Figure 18:
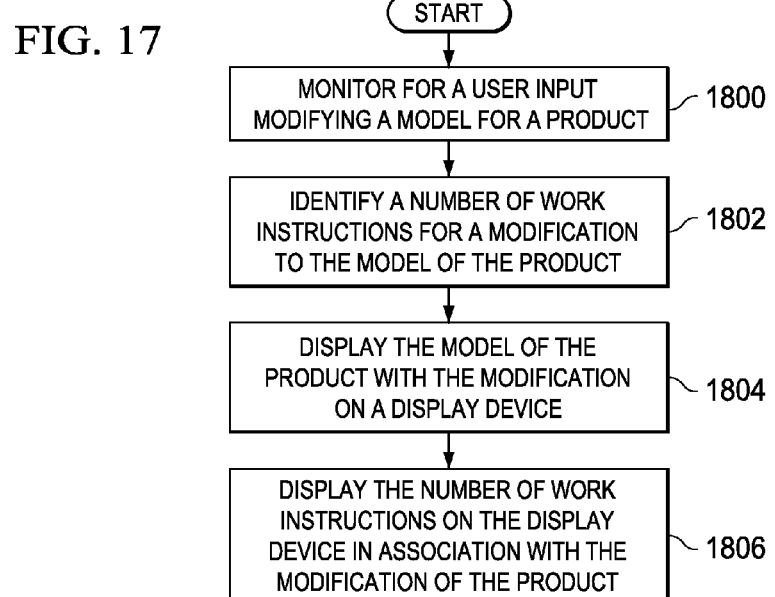
FIG. 18 is a flowchart of a process for generating work instructions in accordance with an advantageous embodiment.

With reference now to FIG. 18, a flowchart of a process for generating work instructions is depicted in accordance with an advantageous embodiment. The process illustrated in FIG. 18 may be implemented in a software component such as, for example, work instruction generation process 608 in FIG. 6.

The process begins by monitoring for a user input modifying a model for a product (operation 1800). In response to detecting the user input modifying the model for the product, the process identifies a number of work instructions for a modification to the model of the product (operation 1802).

This modification may be, for example, changing the shape of the model. For example, the user input may be adding a bend to a flat plate. In other advantageous embodiments, the modification may be, for example, adding a hole to the product, or some other suitable modification. The modification also may be creating an interface between two or more parts. For example, the interface may be connecting a bracket to a structure.

The process displays the model of the product with the modification on a display device (operation 1804). The process also displays the number of work instructions on the display device in association with the modification of the product (operation 1806), with the process terminating thereafter.

Figure 19:
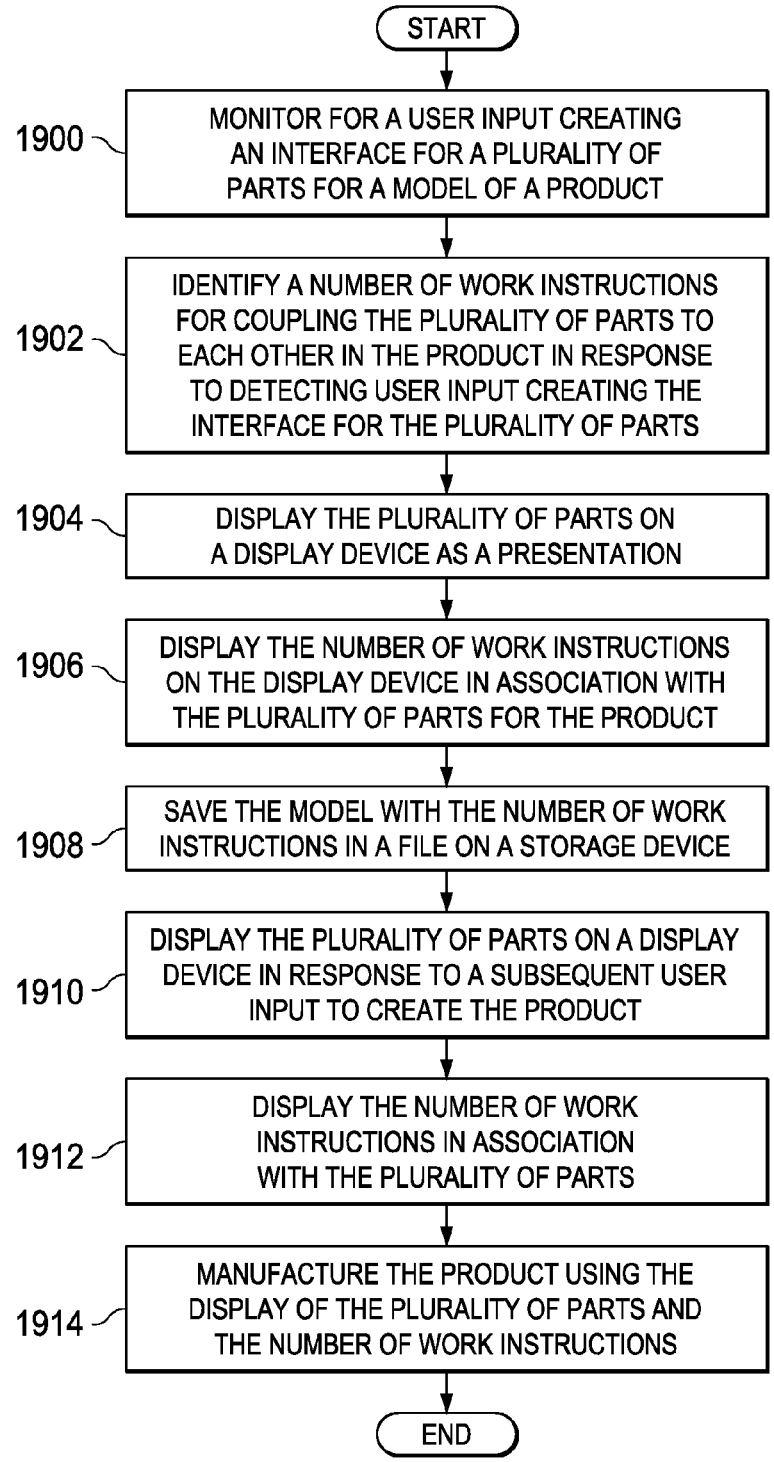
FIG. 19 is a flowchart of a process for generating work instructions in accordance with an advantageous embodiment.

With reference now to FIG. 19, a flowchart of a process for generating work instructions is depicted in accordance with an advantageous embodiment. The process illustrated in FIG. 19 may be implemented in a software component such as, for example, work instruction generation process 608 in FIG. 6.

The process begins by monitoring for a user input creating an interface for a plurality of parts for a model of a product (operation 1900). Responsive to detecting user input creating the interface for the plurality of parts, a number of work instructions are identified for coupling the plurality of parts to each other in the product (operation 1902).

The process displays the plurality of parts on a display device as a presentation (operation 1904). The process also displays the number of work instructions on the display device in association with the plurality of parts for the product (operation 1906). The process then saves the model with the number of work instructions in a file on a storage device (operation 1908).

Responsive to a subsequent user input to create the product, the plurality of parts are displayed on a display device (operation 1910). The process also displays the number of work instructions in association with the plurality of parts (operation 1912). The product may then be manufactured using the display of the plurality of parts and the number of work instructions (operation 1914), with the process terminating thereafter.

Figure 20:
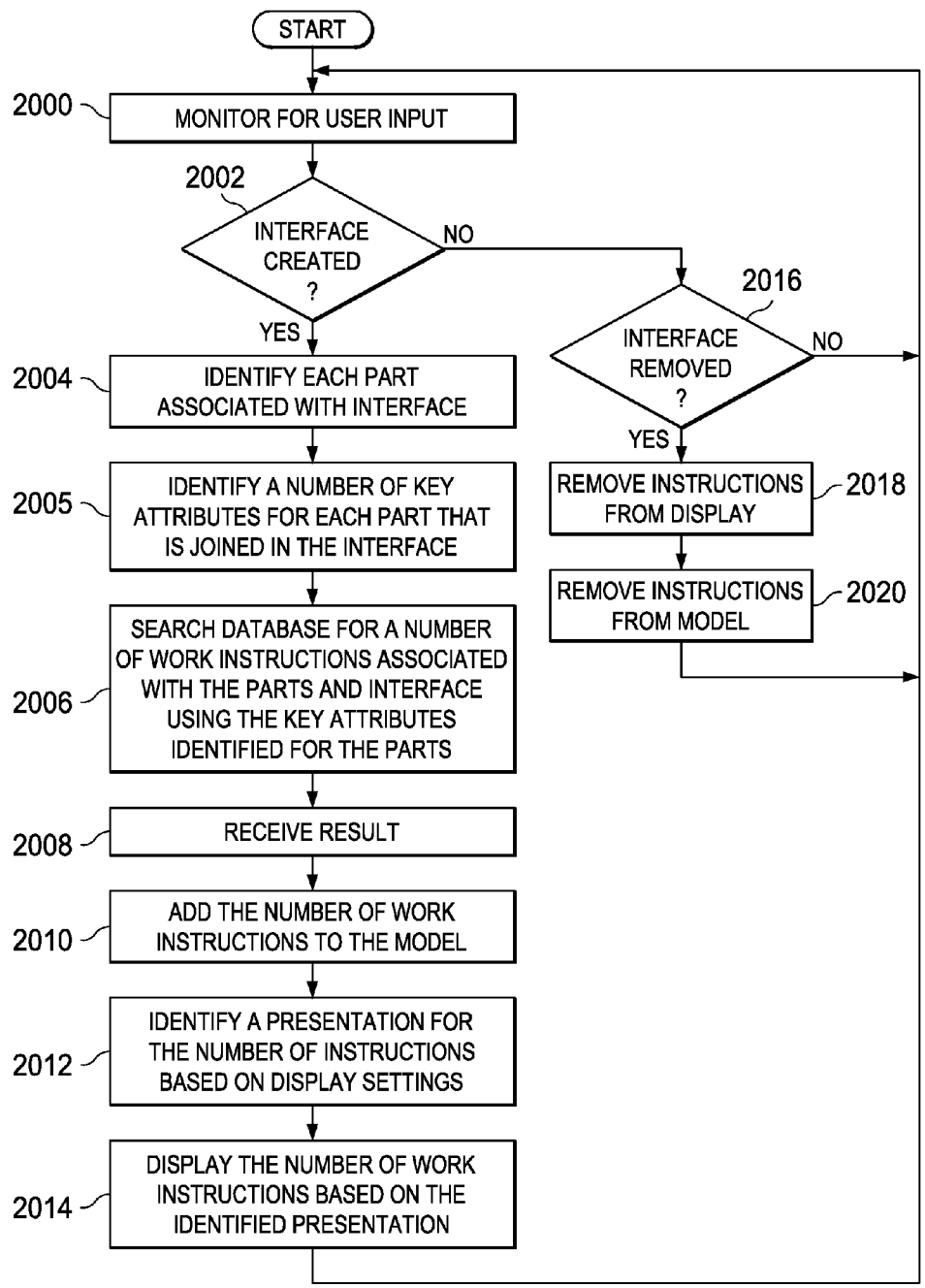
FIG. 20 is a flowchart of a process for generating work instructions in accordance with an advantageous embodiment.

With reference now to FIG. 20, a flowchart of a process for generating work instructions is depicted in accordance with an advantageous embodiment. The process illustrated in FIG. 20 may be implemented in a software component such as, for example, work instruction generation process 608 in FIG. 6.

The process begins by monitoring for a user input (operation 2000). Upon receiving a user input, a determination is made as to whether an interface has been created (operation 2002). If an interface has been created, each part associated with the interface is identified (operation 2004). The interface may be, for example, a physical connection, an electrical connection, or some other suitable connection. A physical connection may be a location where one part may be fastened to another part using a fastener system. An electrical connection may involve connecting wires, connectors, or some other suitable electrical connection.

The process identifies a number of key attributes for each part that is joined in the interface (operation 2005). The process then searches a database for a number of work instructions associated with the parts and the interface using the key attributes identified for the parts (operation 2006). Operation 2006 may be performed by querying a work instruction database such as work instruction database 314 in FIG. 3. A result is received in response to the query (operation 2008).

In response to receiving the result, a number of work instructions in the result are added to the model (operation 2010). The presentation of the number of work instructions may be based on options or parameters set by the user. For example, the instructions may be presented one at a time, in a scrolling fashion, or in some other suitable type of presentation. A presentation of the number of instructions is identified based on display settings (operation 2012).

These display settings may be set by the user. For example, all of the instructions may be displayed in association with the parts. In another example, only some or none of the instructions may be displayed. For example, when some instructions are displayed, the instructions may be displayed for the most recent interface or interfaces generated in the design session.

The number of work instructions are then displayed based on the identified presentation (operation 2014), with the process then returning to operation 2000 as described above. With reference again to operation 2002, if the user input does not create an interface, a determination is made as to whether the user input removes an interface (operation 2016). If the user input removes an interface, the instructions associated with the interface are removed from the display (operation 2018).

The process then removes the instructions associated with the interface from the model (operation 2020). The process then returns to operation 2000 as described above. With reference back to operation 2016, if the user input does not remove an interface, the process also returns to operation 2000 as described above.

Figure 21:
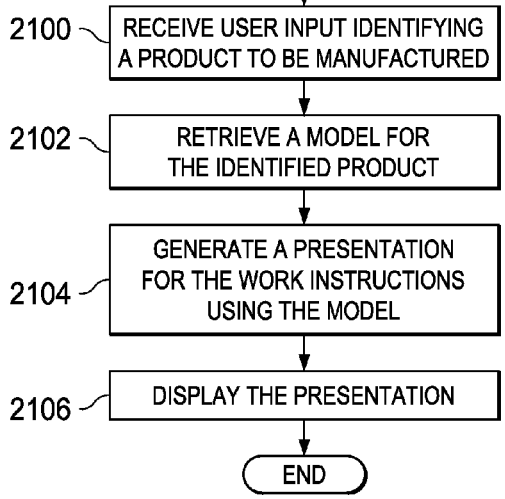
FIG. 21 is a flowchart of a process for presenting work instructions to manufacture a product in accordance with an advantageous embodiment.

With reference now to FIG. 21, a flowchart of a process for presenting work instructions to manufacture a product is depicted in accordance with an advantageous embodiment. The process illustrated in FIG. 21 may be implemented in a software component such as, for example, computer aided design application 318 in FIG. 3.

The process begins by receiving user input identifying a product to be manufactured (operation 2100). The process retrieves a model for the identified product (operation 2102). This model may be retrieved from a database such as, for example, product database 312 in FIG. 3.

The process then generates a presentation for the work instructions using the model (operation 2104). This presentation may be generated based on parameters or attributes in the model or based on user settings or input. The presentation, in these examples, includes a number of drawings of the parts with work instructions in association with the parts. The presentation of the work instructions may vary depending on the particular presentation. The process then displays the presentation (operation 2106), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method, apparatus, and computer program product for automatically creating work instructions to manufacture a product. Monitoring may be performed for user input that creates an interface for a plurality of parts for a model of the product. In response to detecting the user input creating the interface for the plurality of parts, a number of work instructions are identified for coupling the plurality of parts to each other in the product. The plurality of parts is displayed on a display device. The number of instructions is also displayed on the display device in association with the plurality of parts for the product.

One or more of the different advantageous embodiments provide a capability for automatically generating work instructions while a product is being designed. Further, the work instructions may be changed when a model for a product is altered. In this manner, work instructions may remain consistent and up to date as products are designed and/or changed.

One or more of the different advantageous embodiments provide a capability to maintain a common database between design and manufacturing processes. Further, with the different advantageous embodiments, the presentation may be in the form of a three-dimensional presentation of the product that may be manipulated and viewed in association with the instructions to couple or attach parts to each other.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by, or in connection with, the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of products.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

The different advantageous embodiments may also be applied to the manufacturing of computers, furniture, aircraft parts, automobile parts, consumer electronics, valves, oil drilling equipment, manufacturing equipment, and/or other suitable products.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a product, the method comprising:
    monitoring, by a processor, for a modification to a model for the product, wherein the model comprises a geometric object comprising a number of attributes that are embedded in the model;
    responsive to detecting the modification to the model, retrieving data, by the processor, from an attribute in the number of attributes to form retrieved data, analyzing the retrieved data to identify a number of identified work instructions associated with the modification, the number of identified work instructions comprising instructions for installation, assembly or fabrication, to be included for use in manufacturing a product, and forming a modified model which comprises the number of identified work instructions;
    displaying on a display device the modified model together with the number of identified work instructions to form a display; and
    manufacturing the product using the display including the number of identified work instructions.

2. The method of claim 1, wherein the product comprises a number of parts and wherein the modification of the model is to a part in the number of parts in the model to form the modified model.

3. The method of claim 2 wherein the modification of the model creates an interface for an associated number of parts and wherein the number of identified work instructions comprise a number of text instructions for attaching the associated number of parts to each other.

4. The method of claim 1 further comprising:
    saving the modified model with the number of identified work instructions in a file on a storage device.

5. The method of claim 1, wherein the identifying step comprises:
    identifying the number of identified work instructions from a database of work instructions.

6. The method of claim 1, wherein the modified model together with the number of identified work instructions are displayed on a display device located in a manufacturing facility.

7. A method for manufacturing a product, the method comprising:
monitoring, by a processor, for a modification to a model of the product, wherein the model comprises a geometric object comprising a number of attributes that are embedded in the model, wherein the product comprises a number of parts;
responsive to detecting the modification to the model, retrieving data, by the processor, from an attribute in the number of attributes, analyzing retrieved data to identify a number of identified instructions associated with the modification, and forming a modified model which comprises the number of identified instructions, wherein the number of identified instructions comprise a number of work instructions for attaching the number of parts to each other, where the number of work instructions are included for use in manufacturing the product;
displaying, on a display device, the number of parts together with the number of work instructions to form a display; and
manufacturing the product using the display including the number of work instructions.

8. The method of claim 7 further comprising:
saving the modified model with the number of work instructions in a file on a storage device.

9. The method of claim 7 further comprising:
responsive to subsequent user input to create the product, displaying the number of parts together with the number of work instructions.

10. The method of claim 7, wherein the identifying step comprises:
identifying the number of work instructions from a database of text instructions.

11. The method of claim 10, wherein the database of text instructions comprises a plurality of text instructions for a plurality of interfaces for different combinations of the number of parts.

12. The method of claim 8 further comprising:
retrieving the modified model from the storage device; and
thereafter displaying the number of parts with the number of work instructions.

13. The method of claim 9, wherein the number of parts together with the number of work instructions is displayed on another display device located in a manufacturing facility.

14. The method of claim 12, wherein the step of displaying the number of parts with the number of work instructions comprises:
displaying the number of parts with the number of work instructions as a single presentation.

15. The method of claim 12, wherein the step of displaying the number of parts with the number of work instructions comprises:
displaying the number of parts with the number of instructions in stages.

16. A manufacturing system including a data processing system, the data processing system comprising:
a bus;
a communications unit connected to the bus;
a non-transitory computer recordable storage medium connected to the bus, wherein the non-transitory computer recordable storage medium includes program code; and
a processor unit connected to the bus, wherein the processor unit executes the program code to monitor for a user input modifying a model for a product, wherein the model comprises a geometric object comprising a number of attributes that are embedded in the model, and wherein the model is produced using a modeling program stored on a non-transitory computer readable storage medium and executed by a processor in communication with the non-transitory computer readable storage medium; retrieve data from an attribute in the number of attributes in response to detecting the user input modifying the model for the product; modify the model to form a modified model; analyze the data to create an analysis and, based on the analysis, receive at the modeling program a number of work instructions for installation, assembly or fabrication associated with the modified model; and display, on a display device in communication with the processor, the modified model together with the number of work instructions to be included for use in manufacturing the product; and
wherein the manufacturing system further includes manufacturing equipment and the number of work instructions are used to manufacture the product using the display.

17. The manufacturing system of claim 16, wherein the processor unit further executes the program code to display the modified model together with the number of work instructions in response to subsequent user input to create the product.

18. The manufacturing system of claim 16 wherein the product comprises a number of parts and wherein the user input modifies a part in the model.

19. The manufacturing system of claim 16, wherein the processor unit further executes the program code to save the modified model with the number of work instructions in a file on a non-transitory computer recordable storage medium.

20. A manufacturing system including a data processing system, the data processing system comprising:
a bus;
a communications unit connected to the bus;
a non-transitory computer recordable storage medium connected to the bus, wherein the non-transitory computer recordable storage medium includes program code; and
a processor unit connected to the bus, wherein the processor unit executes the program code to monitor for a user input modifying a model of a product, wherein the model comprises a number of geometric objects comprising a number of attributes that are embedded in the model, wherein the model is produced using a modeling program stored on a non-transitory computer readable storage medium and executed by a processor in communication with the non-transitory computer readable storage medium, wherein the product comprises a number of parts, and wherein the user input creates an interface for a number of associated parts; retrieve data from an attribute in the number of attributes in response to detecting the user input creating the interface; modify, using the processor, the model to form a modified model; analyze the data using the processor to form an analysis and, based on the analysis, receive at the modeling program a number of work instructions for attaching the number of associated parts to each other; and display, on a display device in communication with the processor, the number of associated parts together with the number of work instructions to be included for use in manufacturing the product; and
wherein the manufacturing system further includes manufacturing equipment and the number work instructions are used to manufacture the product using the display.

21. The manufacturing system of claim 20, wherein the processor unit further executes the program code to save the modified model with the number of work instructions in a file on a non-transitory computer recordable storage medium.

22. The manufacturing system of claim 20, wherein the processor unit further executes the program code to display the number of associated parts together with the number of work instructions in response to subsequent user input to create the product.

23. The manufacturing system of claim 20, wherein in executing the program code to receive at the modeling program the number of work instructions for attaching the number of associated parts to each other, the processor unit executes the program code to receive the number of work instructions from a database of work instructions.

24. The manufacturing system of claim 23, wherein the database of work instructions comprises a plurality of work instructions for a plurality of interfaces for different combinations of the number of parts.

25. The manufacturing system of claim 21, wherein the processor unit further executes the program code to retrieve the modified model from the non-transitory computer recordable storage medium; and display the number of parts with the number of work instructions for coupling the number of parts.

26. The manufacturing system of claim 22, wherein the number of associated parts with the number of work instructions is displayed on another display device located in a manufacturing facility.

27. The manufacturing system of claim 25, wherein in executing the program code to display the number of parts with the number of work instructions for coupling the number of parts, the processor unit executes the program code to display the number of parts with the number of work instructions for coupling the number of parts as a single presentation.

28. The manufacturing system of claim 25, wherein in executing the program code to display the number of parts with the number of work instructions for coupling the number of parts, the processor unit executes the program code to display the number of parts with the number of work instructions for coupling the number of parts in stages.

29. A non-transitory computer recordable storage medium storing a computer program product for creating work instructions to manufacture a product, the computer program product comprising:
program code, stored on the non-transitory computer recordable storage medium, for monitoring for a user input modifying a model the product, wherein the model comprises a geometric object comprising a number of attributes that are embedded in the model, and wherein the model is produced using a modeling program stored on a non-transitory computer readable storage medium and executed by a processor in communication with the non-transitory computer readable storage medium;
program code, stored on the non-transitory computer recordable storage medium, responsive to detecting the user input modifying the model for the product, for retrieving data from an attribute in the number of attributes;
program code, stored on the non-transitory computer recordable storage medium, for modifying the model to form a modified model;
program code, stored on the non-transitory computer recordable storage medium, for analyzing the data and, based on the analyzing, receive at the modeling program a number of work instructions associated with the modified model, the number of work instructions comprising instructions for installation, assembly or fabrication, to be included for use in manufacturing a product;
program code, stored on the non-transitory computer recordable storage medium, for displaying, on a display device in communication with the processor, the modified model together with the number of work instructions to form a display; and
program code, stored on the non-transitory computer readable medium, for displaying the number of work instructions for use in manufacturing the product using manufacturing equipment based on the display.

30. The non-transitory computer recordable storage medium of claim 29 further comprising:
program code, stored on the non-transitory computer recordable storage medium, responsive to subsequent user input to create the product, for displaying the modified model together with the number of work instructions.

31. The non-transitory computer recordable storage medium of claim 29, wherein the modification of the model is to a part in the model.

32. The non-transitory computer recordable storage medium of claim 29 further comprising:
program code, stored on the non-transitory computer recordable storage medium, for saving the modified model with the number of work instructions in a file on the non-transitory computer recordable storage medium.

33. A non-transitory computer recordable storage medium storing a computer program product for creating work instructions to manufacture a product, the computer program product comprising:
program code, stored on the non-transitory computer recordable storage medium, for monitoring for a user input modifying a model of the product, wherein the model comprises a number of geometric objects comprising a number of embedded attributes that are embedded in the model, wherein the model is produced using a modeling program stored on a non-transitory computer readable storage medium and executed by a processor in communication with the non-transitory computer readable storage medium, wherein the product comprises a number of parts, and wherein the user input creates an interface for a number of associated parts; retrieve data from an attribute in the number of attributes;
program code, stored on the non-transitory computer recordable storage medium, for retrieving data from an embedded attribute in the number of embedded attributes, in response to detecting the user input;
program code, stored on the non-transitory computer recordable storage medium, for modifying, using the processor, the model to form a modified model;
program code, stored on the non-transitory computer recordable storage medium, for analyzing the data and, based on the analyzing, receiving at the modeling program a number of work instructions for attaching the number of associated parts to each other, where the work instructions are included for use in manufacturing the product; and program code, stored on the non-transitory computer recordable storage medium, for displaying, on a display device in communication with the processor, the number of associated parts together with the number of work instructions to form a display; and program code, stored on the non-transitory computer readable medium, for displaying the number of work instructions for use in manufacturing the product using manufacturing equipment based on the display.

34. The non-transitory computer recordable storage medium of claim 33 further comprising:

program code, stored on the non-transitory computer recordable storage medium, for saving the modified model with the number of work instructions in a file on the non-transitory computer recordable storage medium.

\* \* \* \* \*

UNITED STATES PATENT AND TRADEMARK OFFICE
CERTIFICATE OF CORRECTION

PATENT NO. : 9,514,434 B2
APPLICATION NO. : 12/349191
DATED : December 6, 2016
INVENTOR(S) : Krauter et al.

Page 1 of 1

It is certified that error appears in the above-identified patent and that said Letters Patent is hereby corrected as shown below:

In the Claims

Column 21, Line 62, change "of instructions" to -- of work instructions --

Signed and Sealed this
Thirteenth Day of March, 2018

Andrei Iancu
*Director of the United States Patent and Trademark Office*